(12) United States Patent
Kusumoto

(10) Patent No.: US 9,119,075 B2
(45) Date of Patent: Aug. 25, 2015

(54) COMMUNICATION SYSTEM, BASE STATION, AND COUNTERMEASURE METHOD AGAINST CYBER ATTACK

(75) Inventor: Yuichi Kusumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 24 days.

(21) Appl. No.: 13/979,725

(22) PCT Filed: Nov. 1, 2011

(86) PCT No.: PCT/JP2011/075176
§ 371 (c)(1),
(2), (4) Date: Jul. 15, 2013

(87) PCT Pub. No.: WO2012/124207
PCT Pub. Date: Sep. 20, 2012

(65) Prior Publication Data
US 2013/0303120 A1    Nov. 14, 2013

(30) Foreign Application Priority Data
Mar. 17, 2011   (JP) .................................. 2011-059234

(51) Int. Cl.
*H04M 1/66* (2006.01)
*H04W 12/10* (2009.01)
(Continued)

(52) U.S. Cl.
CPC ........... *H04W 12/10* (2013.01); *H04L 63/1416* (2013.01); *H04W 12/12* (2013.01); *H04L 63/0245* (2013.01); *H04W 88/08* (2013.01)

(58) Field of Classification Search
CPC ............ H04L 12/2602; H04L 12/2605; H04L 12/2607; H04L 12/2615; H04L 12/2626; H04L 12/2628; H04L 12/2634; H04L 12/2642; H04L 12/2673; H04L 12/2676; H04L 12/2692; H04L 63/00; H04L 63/14; H04L 63/1408; H04L 63/1416; H04L 63/1425; H04L 63/1433; H04L 63/1441; H04L 63/145; H04L 63/1458; H04L 63/1466; H04L 47/70; H04L 47/80; H04L 47/801; H04L 47/803; H04L 47/805; H04L 47/806; H04L 47/808; H04W 12/00; H04W 12/02; H04W 12/04; H04W 12/06; H04W 12/08; H04W 12/10; H04W 12/12
USPC .............. 455/404.1, 405, 406–408, 423–425, 455/410, 411; 370/229–240, 252, 253
See application file for complete search history.

(56) References Cited

U.S. PATENT DOCUMENTS 7,773,507 B1 *  8/2010  Kasralikar et al. ............ 370/230
2005/0174961 A1  8/2005  Hrastar
(Continued)

FOREIGN PATENT DOCUMENTS

JP   2004-221969 A   8/2004
JP   2004-356915 A   12/2004
(Continued)

OTHER PUBLICATIONS

Communication dated Sep. 9, 2014 from the Japanese Patent Office in counterpart Japanese Patent Application No. 2013504509.
(Continued)

*Primary Examiner* — Mazda Sabouri
(74) *Attorney, Agent, or Firm* — Sughrue Mion, PLLC

(57) ABSTRACT

A communication system according to the present invention includes: a mobile terminal; a base station; an operation/maintenance server; and a gateway that has a DPI function that detects whether or not uplink data received from the mobile terminal is illegal traffic. If the base station detects that an amount of the traffic of uplink data exceeds a threshold, the base station transmits an alarm, that denotes that the amount of the traffic of uplink data exceeds the threshold, to the operation/maintenance server. If the operation/maintenance server receives alarm from the base station, the operation/maintenance server transmits to the gateway an activation command that causes the gateway to activate the DPI function.

2 Claims, 3 Drawing Sheets

(51) Int. Cl.
  *H04L 29/06* (2006.01)
  *H04W 12/12* (2009.01)
  *H04W 88/08* (2009.01)

(56) References Cited

U.S. PATENT DOCUMENTS

2007/0271457 A1  11/2007  Patil et al.
2009/0238090 A1*  9/2009  Sambhwani et al. ......... 370/252

FOREIGN PATENT DOCUMENTS

| JP | 2006-513617 A | 4/2006 |
|---|---|---|
| JP | 2006100874 A | 4/2006 |
| JP | 2007-174287 A | 7/2007 |
| JP | 2010226635 A | 10/2010 |
| JP | 2011-010155 A | 1/2011 |
| JP | 2011-015449 A | 1/2011 |
| JP | 2011-501910 A | 1/2011 |
| KR | 1020060007292 A | 1/2006 |
| KR | 1020100127837 A | 12/2010 |
| WO | 2004/064421 A1 | 7/2004 |
| WO | 2009031453 A1 | 3/2009 |
| WO | 2009/046760 A1 | 4/2009 |

OTHER PUBLICATIONS

Communication dated Sep. 4, 2014 from the European Patent Office in counterpart European Patent Application No. 11861002.1.
Xiaoming Lu et al., "A Real Implementation of DPI in 3G Network", Globecom 2010, 2010 IEEE Global Telecommunications Conference, IEEE, Piscataway, NJ, USA, Dec. 6, 2010, pp. 1-5.
Communication dated Dec. 19, 2014, issued by the Korean Intellectual Property Office in counterpart Application No. 1020137027272.

* cited by examiner

COMMUNICATION SYSTEM, BASE STATION, AND COUNTERMEASURE METHOD AGAINST CYBER ATTACK

CROSS REFERENCE TO RELATED APPLICATIONS

This application is a National Stage of International Application No. PCT/JP2011/075176 filed Nov. 1, 2011, claiming priority based on Japanese Patent Application No. 2011-059234 filed Mar. 17, 2011, the contents of all of which are incorporated herein by reference in their entirety.

TECHNICAL FIELD

The present invention relate to communication system, base station, and countermeasure method against cyber attack.

BACKGROUND ART

In recent years, as communication systems have advanced remarkably, they have been exposed to a diversity of cyber attacks. As a result, countermeasure against cyber attack has been sought.

Likewise, mobile terminals are exposed to cyber attacks and the mobility of the mobile terminal causes itself to be exposed to complicated cyber attacks.

In particular, if an SIM (Subscriber Identification Module) is illegally obtained from a mobile terminal that has not been SIM-locked, it is likely that cyber attack will be conducted through the SIM.

In 3GPP (Third Generation Partnership Project), an LTE (Long Term Evolution) system, which is a new communication system, has been standardized (refer to Patent Literature 1 and so forth).

However, in the standard protocol defined in 3GPP, a core-network side PDN-GW (Packet Data Network-Gateway) in the LTE system is provided with a DPI (Deep Packet Inspection) function that detects illegal traffic.

In other words, according to the standard protocol defined in 3GPP, an eNB (evolved Node B) of the LTE system cannot directly monitor the contents of user data. Thus, illegal traffic has to be detected using the DPI function of the core-network side.

RELATED ART LITERATURE

Patent Literature

Patent Literature 1: JP2011-010155A, Publication

SUMMARY OF THE INVENTION

Problem to be Solved by the Invention

As described above, in the LTE system, illegal traffic has to be detected using the DPI function of the core-network side.

Thus, even if a large amount of data is transmitted from a UE (User Equipment) to an eNB, a problem in which the eNB cannot actively detect a cyber attack when a large amount of user data is transmitted from the UE arises.

Therefore, an object of the present invention is to provide a communication system, a base station, and a countermeasure method against cyber attacks that can solve the foregoing problem.

Means that Solve the Problem

A communication system according to the present invention includes:
a mobile terminal;
a base station;
an operation/maintenance server; and
a gateway that has a DPI function that detects whether or not uplink data received from said mobile terminal is illegal traffic,
wherein if said base station detects that an amount of the traffic of said uplink data exceeds a threshold, said base station transmits an alarm, that denotes that the traffic amount of said uplink data exceeds the threshold, to said operation/maintenance server, and
wherein if said operation/maintenance server receives said alarm from said base station, said operation/maintenance server transmits to said gateway an activation command that causes said gateway to activate said DPI function.

A base station according to the present invention, includes:
a user data processing unit that monitors whether or not an amount of the traffic of uplink data received from a mobile terminal exceeds a threshold; and
a communication control unit that transmits an alarm that denotes that the traffic amount of said uplink data exceeds the threshold to an operation/maintenance server, if the traffic amount of said uplink data exceeds the threshold, such that said operation/maintenance server transmits to said gateway an activation command that causes a gateway to activate a DPI function that detects whether or not said uplink data is illegal traffic.

A countermeasure method against cyber attack according to the present invention is a countermeasure method for base station against cyber attack includes steps of:
monitoring whether or not an amount of the traffic of uplink data received from a mobile terminal exceeds a threshold; and
transmitting an alarm, that denotes that the amount of the traffic of said uplink data exceeds the threshold, to an operation/maintenance server, if the amount of the traffic of said uplink data exceeds the threshold, such that said operation/maintenance server transmits to said gateway an activation command that causes a gateway to activate a DPI function that detects whether or not said uplink data is illegal traffic.

Effect of the Invention

According to the present invention, if a mobile terminal transmits a large amount of uplink data to a base station, the base station activates a DPI function of a gateway through an operation/maintenance server.

Thus, an effect in which the base station can actively detect a cyber attack with a large amount of uplink data transmitted from the mobile terminal can be obtained.

DESCRIPTION OF EMBODIMENTS

Next, with reference to the accompanying drawings, an exemplary embodiment of the present invention will be described.

(1) Structure of this Exemplary Embodiment

(1-1) Overall Structure of Communication System

Figure 1:
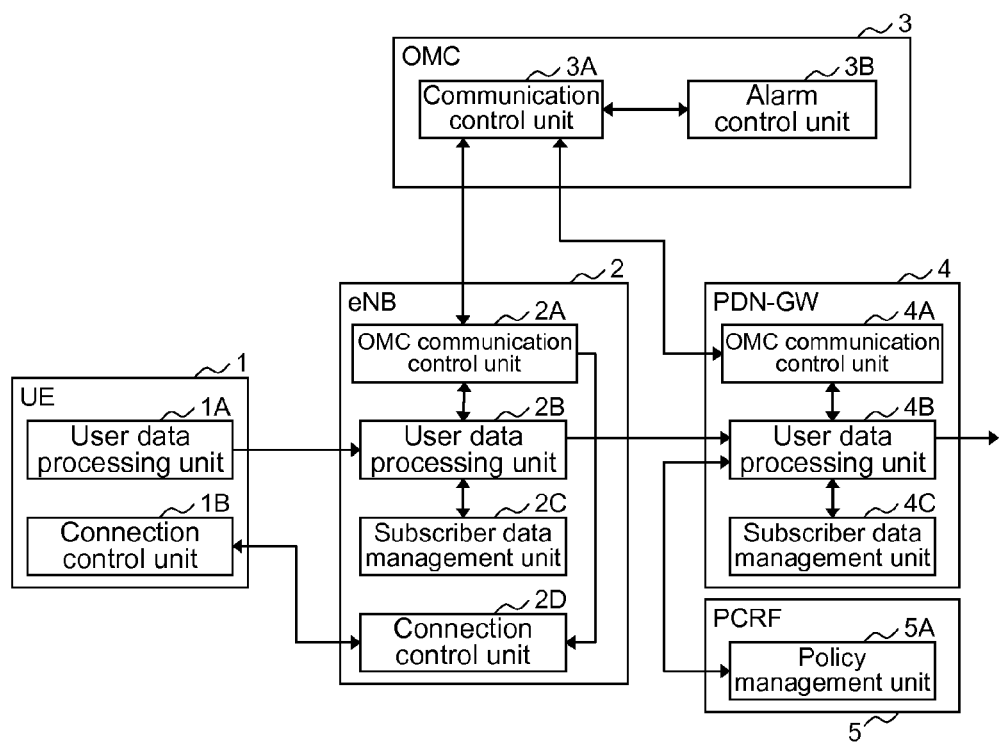
FIG. 1 is a block diagram showing the structure of a communication system according to an exemplary embodiment of the present invention.

Referring to FIG. 1, the communication system according to this exemplary embodiment is an LTE system that has UE 1 that is a mobile terminal; eNB 2 that is a base station; OMC (Operations and Maintenance Centre) 3 that is an operation/maintenance server; PDN-GW 4 that is a gateway; and PCRF (Policy and Charging Rules Function) 5 that is a policy/charging server.

(1-2) Structure of UE 1

Referring to FIG. 1, UE 1 has user data processing unit 1A and connection control unit 1B.

User data processing unit 1A transmits uplink user data (U-Plane data) whose destination is a predetermined server (not shown) on the Internet to eNB 2. The user data may contain illegal data with which a cyber attack is conducted against the server on the Internet.

Connection control unit 1B transmits a Scheduling Request message (resource allocation request message) to eNB 2 so as to request eNB 2 to allocate uplink resources for uplink user data.

(1-3) Structure of eNB 2

Referring to FIG. 1, eNB 2 has OMC communication control unit 2A, user data processing unit 2B, subscriber data management unit 2C, and connection control unit 2D.

When user data processing unit 2B receives uplink user data from UE 1, user data processing unit 2B transmits the user data to PDN-GW 4.

If the amount of the traffic of user data received from UE 1 exceeds a predetermined threshold that has been set up for each UE 1, user data processing unit 2B detects the uplink user data received from the relevant UE 1 as doubtful traffic that is likely to be illegal traffic.

When user data processing unit 2B detects doubtful traffic, user data processing unit 2B obtains subscriber data of UE 1 that has transmitted the doubtful traffic from subscriber data management unit 2C.

User data processing unit 2B outputs a transmission data amount excess alarm that contains subscriber data of the relevant UE 1 and that notifies OMC communication control unit 2A that the amount of the traffic of the uplink user data received from the relevant UE 1 exceeds the threshold to OMC communication control unit 2A.

When user data processing unit 2B outputs the transmission data amount excess alarm to OMC communication control unit 2A, OMC communication control unit 2A transmits the transmission data amount excess alarm to OMC 3.

When OMC communication control unit 2A receives an illegal traffic stop request (that will be described later) from OMC 3, OMC communication control unit 2A outputs the illegal traffic stop request to connection control unit 2D.

When subscriber data management unit 2C receives an inquiry about the subscriber data from user data processing unit 2B, subscriber data management unit 2C outputs the subscriber data to user data processing unit 2B.

When connection control unit 2D receives the Scheduling Request message from UE 1, connection control unit 2D calculates UL Grant that denotes whether or not to allocate uplink resources to UE 1 based on an ordinary algorithm and sends the calculated UL Grant to UE 1.

However, if OMC communication control unit 2A outputs the illegal traffic stop request to connection control unit 2D, connection control unit 2D sends UL Grant=0 that denotes that uplink resources are not allocated to UE 1 in reply to the Scheduling Request message received from UE 1 back to UE 1.

When user data processing unit 1A of UE 1 receives UL Grant=0 from eNB 2, user data processing unit 1A stops transmitting the uplink user data.

(1-4) Structure of OMC 3

Referring to FIG. 1, OMC 3 has communication control unit 3A and alarm control unit 3B.

When communication control unit 3A receives the transmission data amount excess alarm from eNB 2, communication control unit 3A outputs the transmission data amount excess alarm to alarm control unit 3B.

Simultaneously, communication control unit 3A transmits a DPI activation command that contains the subscriber data of the relevant UE 1 contained in the transmission data amount excess alarm and that causes the DPI function to be activated for the relevant UE 1 to PDN-GW 4.

In addition, when communication control unit 3A receives an illegal traffic detection notification (that will be described later) from PDN-GW 4, communication control unit 3A transmits an illegal traffic stop request that contains the subscriber data of the relevant UE 1 and that causes eNB 2 to stop transmitting the user data of the relevant UE 1 to eNB 2.

When communication control unit 3A outputs the transmission data amount excess alarm to alarm control unit 3B, alarm control unit 3B stores the transmission data amount excess alarm as log.

(1-5) Structure of PDN-GW 4

Referring to FIG. 1, PDN-GW 4 has OMC communication control unit 4A, user data processing unit 4B, and subscriber data management unit 4C.

When OMC communication control unit 4A receives the DPI activation command from OMC 3, OMC communication control unit 4A outputs the DPI activation command to user data processing unit 4B.

When user data processing unit 4B receives uplink user data from eNB 2, user data processing unit 4B transmits the user data to the server on the Internet through the PDN.

When OMC communication control unit 4A outputs the DPI activation command to user data processing unit 4B, user data processing unit 4B transmits to PCRF 5 a contract policy request that requests the contract policy of the relevant UE 1 corresponding to the subscriber data contained in the DPI activation command.

User data processing unit 4B receives a contract policy notification for the contract policy of the relevant UE 1 from PCRF 5 in reply to the contract policy request.

User data processing unit 4B activates the DPI function for the uplink user data received from the relevant UE 1. Thereafter, user data processing unit 4B compares a payload of the uplink user data received from the relevant UE 1 with a traffic permission condition defined in the contract policy obtained from PCRF 5 so as to detect whether or not the uplink user data received from the relevant UE 1 is illegal traffic.

When user data processing unit 4B detects illegal traffic, user data processing unit 4B outputs to OMC communication control unit 4A the illegal traffic detection notification that contains the subscriber data of the relevant UE 1 and that notifies OMC communication control unit 4A that the uplink user data of the relevant UE 1 is illegal traffic.

When user data processing unit 4B outputs the illegal traffic detection notification to OMC communication control unit 4A, OMC communication control unit 4A transmits the illegal traffic detection notification to OMC 3.

When subscriber data management unit 4C receives an inquiry about subscriber data from user data processing unit 4B, subscriber data management unit 4C outputs the subscriber data to user data processing unit 4B.

(1-6) Structure of PCRF 5

Referring to FIG. 1, PCRF 5 has policy management unit 5A.

When policy management unit 5A receives the contract policy request from PDN-GW 4, policy management unit 5A transmits a contract policy notification for the requested contract policy to PDN-GW 4.

(2) Operation of this Exemplary Embodiment

Next, the operation of the communication system shown in FIG. 1 will be described.

(2-1) Operation Performed Upon Detection of Doubtful Traffic

First, with reference to FIG. 2, the operation of eNB 2 that detects doubtful traffic will be described.

Figure 2:
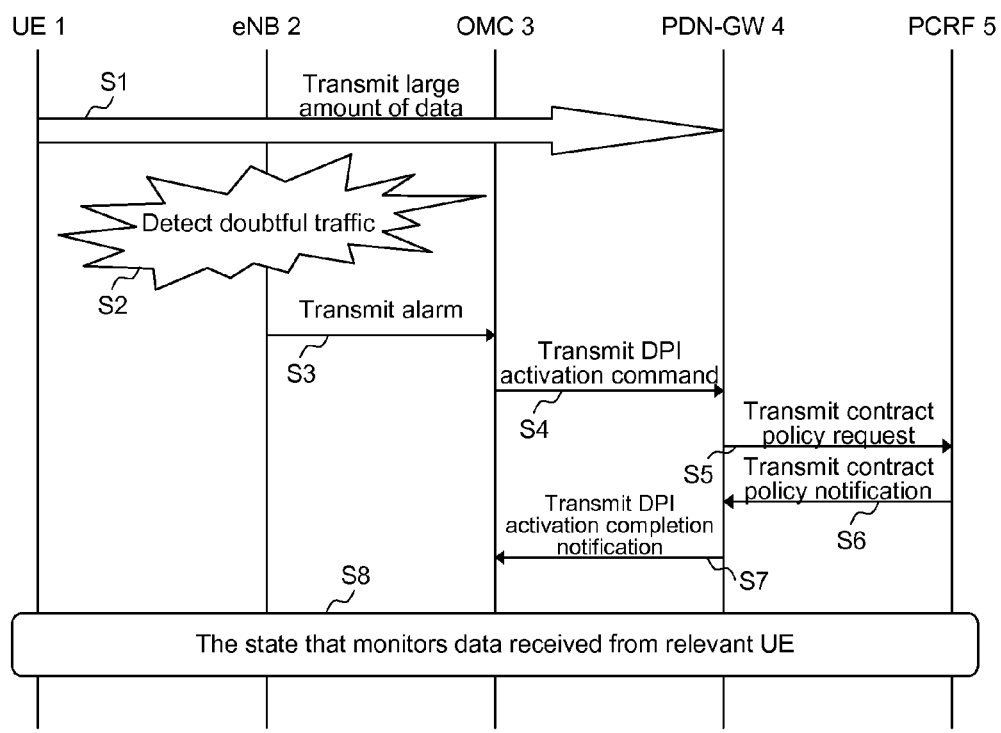
FIG. 2 is a sequence diagram describing the operation that the communication system shown in FIG. 1 performs when it detects doubtful traffic.

Referring to FIG. 2, user data processing unit 2B of eNB 2 monitors whether or not the amount of the traffic of the uplink user data received from UE 1 exceeds a predetermined threshold that has been set up for each UE 1. If the amount of the traffic exceeds the threshold, user data processing unit 2B detects the uplink user data received from the relevant UE 1 as doubtful traffic that is likely to be illegal traffic (at steps S1 and S2). Thereafter, OMC communication control unit 2A transmits to OMC 3 the transmission data amount excess alarm that contains the subscriber data of the relevant UE 1 and that notifies OMC 3 that the amount of the traffic of the uplink user data received from UE 1 exceeds the threshold (at step S3).

When OMC 3 receives the transmission data amount excess alarm from eNB 2, communication control unit 3A transmits the DPI activation command that contains the subscriber data of the relevant UE 1 and that causes PDN-GW 4 to activate the DPI function to PDN-GW 4 so as to check whether or not the uplink user data received from UE 1 is illegal traffic (at step S4).

When PDN-GW 4 receives the DPI activation command from OMC 3, user data processing unit 4B transmits to PCRF 5 the contract policy request that contains the subscriber data of the relevant UE 1 and that requests PCRF 5 for the contract policy of the relevant UE 1 so as to check the traffic permission condition of the relevant UE 1 (at step S5).

When PCRF 5 receives the contract policy request from PDN-GW 4, policy management unit 5A retrieves the contract policy of the relevant UE 1 from a database and transmits the contract policy notification that notifies PDN-GW 4 of the retrieved contract policy to PDN-GW 4 (at step S6).

When PDN-GW 4 receives the contract policy notification from PCRF 5, user data processing unit 4B activates the DPI function for the uplink user data received from the relevant UE 1 and then OMC communication control unit 4A transmits to OMC 3 the DPI activation completion notification that notifies OMC 3 that the activation of the DPI function has been completed (at step S7).

Thereafter, the state of user data processing unit 4B of PDN-GW 4 changes to the state that monitors the uplink user data received from the relevant UE 1 (at state S8).

(2-2) Operation Performed Upon Detection of Illegal Traffic

Figure 3:
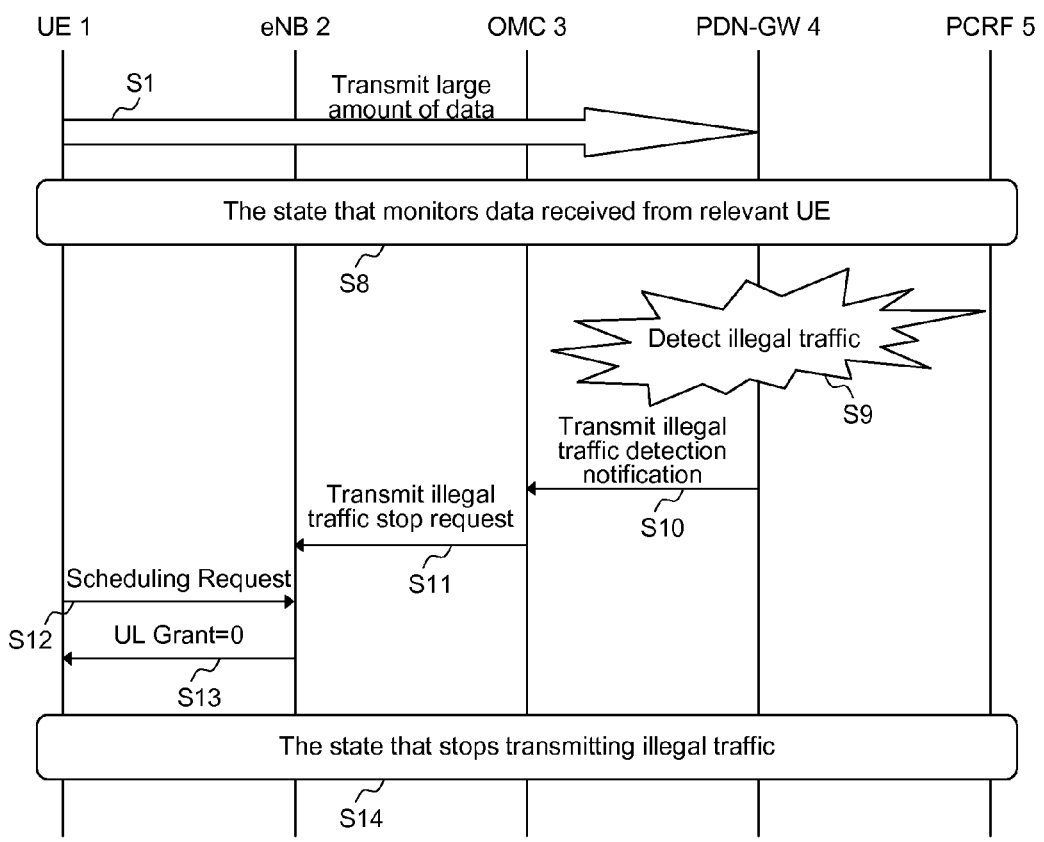
FIG. 3 is a sequence diagram describing the operation that the communication system shown in FIG. 1 performs when it detects illegal traffic.

Next, with reference to FIG. 3, the operation of PDN-GW 4 that detects illegal traffic will be described. FIG. 3 shows the operation after the state of PDN-GW 4 changes to state S8 shown in FIG. 2 that monitors the uplink user data received from the relevant UE 1.

Referring to FIG. 3, user data processing unit 4B of PDN-GW 4 monitors whether or not the payload of the uplink user data received from the relevant UE 1 complies with the traffic permission condition defined in the contract policy concerning which PDN-GW 4 has been notified by PCRF 5. If the payload does not comply with the traffic permission condition, user data processing unit 4B detects that the uplink user data received from the relevant UE 1 is illegal traffic (at step S9). Thereafter, OMC communication control unit 4A transmits to OMC 3 the illegal traffic detection notification that contains the subscriber data of the relevant UE 1 and that notifies OMC 3 that the uplink user data received from the relevant UE 1 have been detected as illegal traffic (at step S10).

When OMC 3 receives the illegal traffic detection notification from PDN-GW 4, communication control unit 3A transmits to eNB 2 the illegal traffic stop request that contains the subscriber data of the relevant UE 1 and that requests eNB 2 to stop transmitting the uplink user data of the relevant UE 1 (at step S11).

Once eNB 2 has received the illegal traffic stop request from OMC 3, even if eNB 2 receives the Scheduling Request message (resource allocation request message) that requests eNB 2 to allocate the uplink resources from the relevant UE 1 (at step S12), connection control unit 2D does not allocate the uplink resources to the relevant UE 1 and sends UL Grant=0 that represents such a situation back to the relevant UE 1 (at step S13).

Thereafter, the state of connection control unit 1B of the relevant UE 1 changes the state that stops transmitting the uplink user data (illegal traffic) (at state S14).

As described above, according to this exemplary embodiment, if eNB 2 that first receives uplink user data from UE 1 detects a large amount of user data (doubtful traffic), eNB 2 activates the DPI function of PDN-GW 4 through OMC 3.

Thus, eNB 2 can actively detects a cyber attack in which a large amount of user data is transmitted from UE 1.

Once eNB 2 has detected a cyber attack in which a large amount of uplink user data is transmitted from UE 1, since eNB 2 does not allocate uplink resources to UE 1 that has conducted the cyber attack, uplink resources can be used for other legal UEs 1 and thereby the uplink resources can be used without loss.

In addition, since UE 1 that has conducted a cyber attack is caused to stop transmitting user data (illegal traffic), illegal traffic can be prevented from flowing between eNB 2 and PDN-GW 4 and thereby the network load can be reduced.

In addition, since the structure of this exemplary embodiment can be accomplished only by adding the activation condition of the DPI function defined in the standard protocol of 3GPP, eNB 2, PDN-GW 4, and PCRF 5 can be very easily implemented according to this exemplary embodiment of the present invention.

With reference to the exemplary embodiment, the present invention has been described. However, it should be understood by those skilled in the art that the structure and details of the present invention may be changed in various manners without departing from the scope of the present invention.

The present application claims priority based on Japanese Patent Application JP 2011-059234 filed on Mar. 17, 2011, the entire contents of which are incorporated herein by reference in its entirety.

The invention claimed is:

1. A communication system, comprising:
a mobile terminal;
a base station;
an operation/maintenance server; and
a gateway that has a Deep Packet Inspection (DPI) function that detects whether or not uplink data received from said mobile terminal is illegal traffic,
wherein if said base station detects that an amount of the traffic of said uplink data exceeds a threshold, said base station transmits an alarm, that denotes that the amount of the traffic of said uplink data exceeds the threshold, to said operation/maintenance server,
wherein if said operation/maintenance server receives said alarm from said base station, said operation/maintenance server transmits to said gateway an activation command that causes said gateway to activate said DPI function,
wherein if said gateway detects that said uplink data is illegal traffic based on said DPI function, said gateway transmits to said operation/maintenance server a detection notification that denotes that said uplink data is illegal traffic,
wherein if said operation/maintenance server receives said detection notification from said gateway, said operation/maintenance server transmits a stop request that requests said base station to stop transmitting said uplink data, and
wherein once said base station has received said stop request from said operation/maintenance server, even if said base station receives an allocation request that requests uplink resources from said mobile terminal, said base station does not allocate the uplink resources to said mobile terminal.

2. The communication system as set forth in claim 1,
wherein if said base station does not allocate uplink resources to said mobile terminal in reply to said allocation request received from said mobile terminal, said base station will transmit a notification that represents such a situation to said mobile terminal.

\* \* \* \* \*